United States Patent
Pettis et al.

(10) Patent No.: US 8,713,531 B1
(45) Date of Patent: Apr. 29, 2014

(54) INTEGRATED BUG TRACKING AND TESTING

(75) Inventors: Eddie Pettis, San Jose, CA (US); Taliver Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 414 days.

(21) Appl. No.: 13/170,841

(22) Filed: Jun. 28, 2011

(51) Int. Cl.
*G06F 9/44* (2006.01)

(52) U.S. Cl.
USPC ............ 717/124; 717/100; 717/125; 717/128

(58) Field of Classification Search
CPC ... G06F 8/20; G06F 11/3636; G06F 11/3664; G06F 11/3688
See application file for complete search history.

(56) References Cited

U.S. PATENT DOCUMENTS

| | | |
|---|---|---|
| 5,347,518 A | 9/1994 | Lee |
| 5,754,760 A | 5/1998 | Warfield |
| 6,167,358 A * | 12/2000 | Othmer et al. ............... 702/188 |
| 6,772,083 B2 | 8/2004 | Muller et al. |
| 6,907,546 B1 | 6/2005 | Haswell et al. |
| 7,055,067 B2 | 5/2006 | DiJoseph |
| 7,613,953 B2 | 11/2009 | Voruganti |
| 7,644,393 B2 * | 1/2010 | Glerum et al. ............... 717/127 |
| 7,694,181 B2 | 4/2010 | Noller et al. |
| 7,797,687 B2 | 9/2010 | Tillmann et al. |
| 7,849,446 B2 | 12/2010 | Lev et al. |
| 7,886,194 B2 | 2/2011 | Swoboda |
| 8,448,138 B2 * | 5/2013 | Chang et al. ............... 717/124 |
| 8,645,919 B2 * | 2/2014 | Gooi et al. ............... 717/124 |
| 2002/0049962 A1 * | 4/2002 | Kelbaugh et al. ............ 717/128 |
| 2004/0143830 A1 | 7/2004 | Gupton et al. |
| 2005/0149805 A1 * | 7/2005 | Syed et al. ............... 714/741 |
| 2007/0074149 A1 * | 3/2007 | Ognev et al. ............... 717/101 |
| 2008/0141221 A1 * | 6/2008 | Benesovska et al. ......... 717/124 |
| 2009/0265689 A1 * | 10/2009 | Gooi et al. ............... 717/125 |
| 2010/0180260 A1 | 7/2010 | Chikkadevaiah et al. |
| 2010/0299654 A1 * | 11/2010 | Vaswani et al. ............... 717/128 |
| 2011/0035629 A1 | 2/2011 | Noller et al. |
| 2011/0219360 A1 * | 9/2011 | Srinivasa et al. ............... 717/124 |
| 2012/0023475 A1 * | 1/2012 | Surazski et al. ............ 717/100 |

OTHER PUBLICATIONS

Breu et al., Information needs in bug reports: improving cooperation between developers and users, Feb. 2010, 10 pages.*
Rastkar et al., Summarizing software artifacts: a case study of bug reports, May 2010, 10 pages.*
Bettenburg et al., What makes a good bug report?, Nov. 2008, 11 pages.*
Inflectra Corporation, Automated Testing, web page, Apr. 18, 2011, http://www.inflectra.com/SpiraTest/Highlights.aspx?feature=Automated-Testing.
Final Office Action for related matter mailed Dec. 10, 2013. U.S. Appl. No. 13/415,316, filed Mar. 8, 2012.

* cited by examiner

*Primary Examiner* — Thuy Dao
(74) *Attorney, Agent, or Firm* — Young Basile Hanlon & MacFarlane P.C.

(57) ABSTRACT

A computer implemented software testing method includes receiving a bug report regarding software under test; storing the bug report in a computer readable data store upon receiving the bug report; setting an a status indicator for the bug report to an open condition upon storing the bug report; requesting execution of a test procedure corresponding to the bug report; executing the test procedure using a processor; receiving a test result from the processor indicating a pass state or a fail state for the test procedure; and setting the status indicator for the bug report to a closed condition if the pass state is determined for the test procedure.

11 Claims, 6 Drawing Sheets

INTEGRATED BUG TRACKING AND TESTING

TECHNICAL FIELD

The disclosure relates to the field of software development, and more particularly, to bug tracking and testing.

BACKGROUND

Large software development projects rely on tracking and testing procedures to identify and correct quality and performance issues. These issues, commonly referred to as "bugs," have many root causes, including, but not limited to, errors, flaws, mistakes, failures, or faults that exist in the computer program, are induced in the software, or are induced in the computer system that the software is executed on. The results produced by software bugs are as varied as the root causes and include, but are not limited to, refusal of the software to execute, incorrect or unintended results, or performance and stability problems during execution of the software.

As the size of a software development project increases, the number of bugs to be tracked and managed also increases. The time consuming nature of such processes makes it difficult to identify when bugs are fixed. As a result, low priority bugs are often ignored or not tracked at all. This is especially true in cases where the unit test that has been developed for a bug report produces a correct output, but performance issues remain.

SUMMARY

A computer implemented software testing method includes receiving a bug report regarding software under test; storing the bug report in a computer readable data store upon receiving the bug report; setting an a status indicator for the bug report to an open condition upon storing the bug report; requesting execution of a test procedure corresponding to the bug report; executing the test procedure using a processor; receiving a test result from the processor indicating a pass state or a fail state for the test procedure; and setting the status indicator for the bug report to a closed condition if the pass state is determined for the test procedure.

Another computer implemented software testing method includes receiving a plurality of bug reports regarding software under test, each bug report including a test procedure and an assessment procedure; storing the bug reports in a computer readable data store upon receiving the bug report; setting an a status indicator for each bug report to an open condition upon storing each bug report; requesting execution of the test procedure corresponding to each bug reports on a selective basis in response to the open condition of the status indicator of the bug report; executing the test procedure of each selected bug report using a processor to produce a test output; executing the assessment procedure of each selected bug report using the processor of the software testing system to produce a test result by comparing a test output of the test procedure to a predetermined criteria, the test result indicating a pass state or a fail state for the test procedure; sending the test result to the bug tracking system; and setting the status indicator for each selected bug report to a closed condition if the pass state is determined for the test procedure.

A bug tracking and testing system includes a bug tracking system that is configured to receive a plurality of bug reports regarding software under test, store the bug reports in a computer readable data store, and set an a status indicator for each bug report to an open condition upon storing each bug report, each bug report including a test procedure and an assessment procedure; and a software testing system configured to receive test requests for selected bug reports of the plurality of bug reports, where the selected bug reports have the open condition, execute the test procedure of each selected bug report using a processor of the software testing system to produce a test output, and execute the assessment procedure of each selected bug report using the processor of the software testing system to produce a test result indicating a pass state or a fail state for the test procedure based on the test output, where the test result is sent to the bug tracking system, and the status indicator for each selected bug report is set to the closed condition by the bug tracking system if the pass state is determined.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
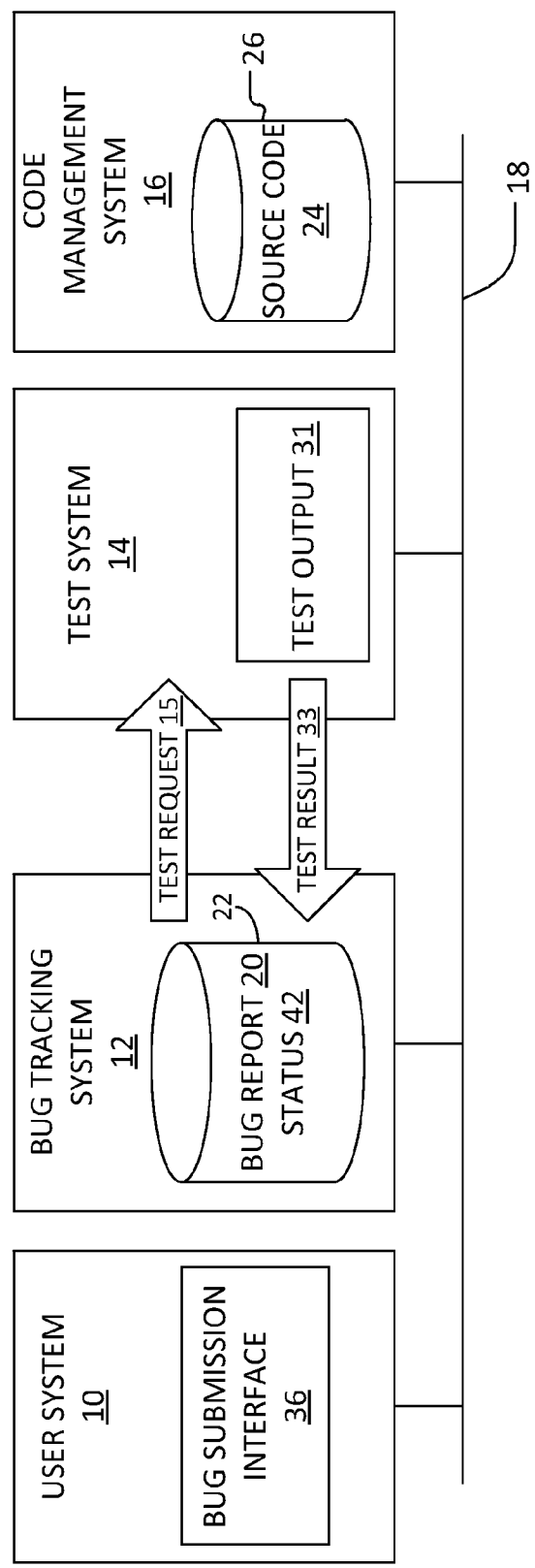
FIG. 1 is a diagram showing an integrated bug tracking and testing system implemented in an exemplary environment.

FIG. 1 is a diagram showing an integrated bug tracking and testing system implemented in an exemplary environment. A user system 10, a bug tracking system 12, a software testing system 14, and a code management system 16 are connected to a network 18. Each of these systems may be a single system or multiple systems. The network 18 allows communication between these systems in any suitable manner.

Figure 2:
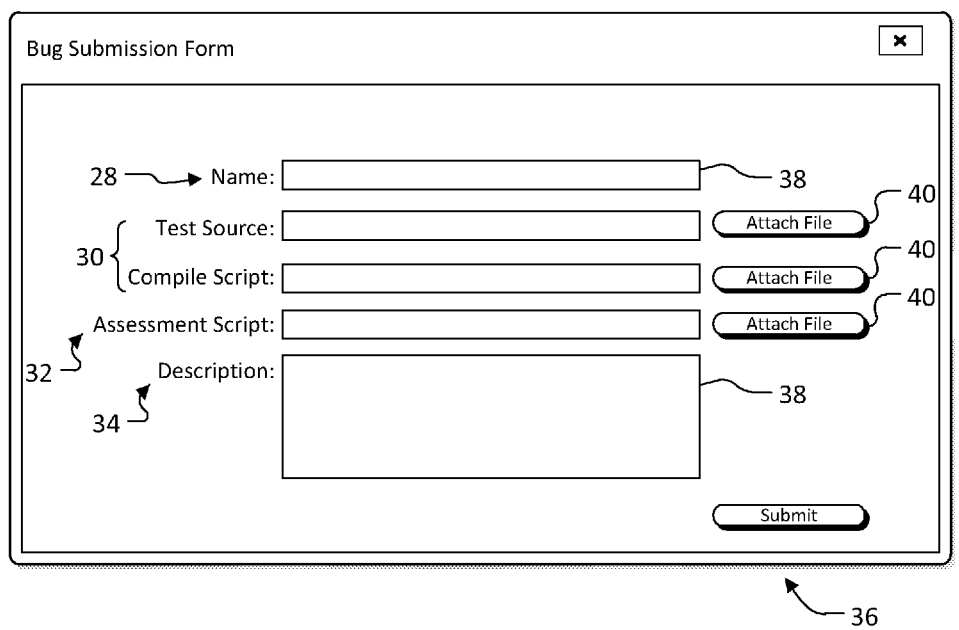
FIG. 2 is an illustration showing an exemplary bug submission interface.

A bug report 20 is composed using the user system 10, and is transmitted to the bug tracking system 12, where it is stored in a tracking data store 22. The bug report 20 relates to a computer program that is defined by software source code 24 that is stored in a code repository 26 of the code management system 16. As shown in FIG. 2, the bug report includes an identifier 28, a test procedure 30, an assessment procedure 32, and descriptive information 34.

Composition and transmission of the bug report 20 are performed using software the user system 10. In one example, software in the form of an executable is installed on the user system 10 for composing and transmitting the bug report 20. In another example, the user system 10 accesses a web application that is hosted by the bug tracking system 12 for composing and transmitting the bug report 20. Such a web application provides data entry fields such as text entry fields or file upload fields for any or all of the identifier 28, the test procedure 30, the assessment procedure 32, and the descriptive information 34. An exemplary web application has a bug submission interface 36. The bug submission interface 36 includes text entry fields 38 for the descriptive information 34 and file upload fields 40 for the test procedure 30 and the assessment procedure 32.

When the bug report 20 is first received by the bug tracking system 12, the status indicator 42 is set to the open condition.

The status indicator 42 can later be changed to the open condition by the software testing system 14, as will be explained, or can be changed by the user.

The identifier 28 of the bug report 20 includes information such as a descriptive name or a tracking number that is either selected by the user or computer-generated. For example, the bug tracking system 12 can generate and assign an MD5 tag when the bug report 20 is received, and store the MD5 tag in the tracking data store as part of the bug report.

The test procedure 30 of the bug report 20 is a computer-executable procedure that is adapted to be executed by an automated testing system, such as the software testing system 14. The test procedure 30 can be manually created by user. The test procedure 30 is designed to test a software including, but not limited to, the software source code 24, a unit of the software source code 24, a computer program that is generated by the software source code when it is compiled, if applicable, or behavior of the computer program when executed. The software being tested by the test procedure is referred to herein as the "software under test."

The test procedure 30 can be designed to replicate a previously identified erroneous behavior that is generated by the software source code 24 when executed. The erroneous behavior includes an error, an unexpected result, failure of the software to operate, failure of the software to operate in the manner intended, less than optimal performance by the software, or any other identifiable anomalous behavior. Alternatively, the test procedure 30 can be designed prior to identification of an erroneous behavior, in order to verify proper operation of the software source code 24. For example, the test procedure 30 can be designed to verify that the software source code 24 performs properly when unusual values are passed to the software source code 24 as input parameters (e.g. corner cases).

In one example, the test procedure 30 is a unit test. In another example, the test procedure 30 includes scripted actions. In another example, the test procedure 30 includes one or more input parameters. In a further example, the test procedure 30 includes a unit test and a script that compiles and executes the unit test. The test procedure 30 can be configured to accept the identifier 28 as an argument in order to allow subsequent processing. If the code being tested is a function intended to calculate pi, the test procedure can be a unit test that that compiles the function, calls the function, and provides input arguments such as the number of digits of pi to be calculated.

When the test procedure 30 is executed by the software testing system 14, a test output 31 is produced by the software testing system 14. The test output 31 is the result obtained by the test procedure 30. In one example, the test output 31 includes the result of a calculation and the time elapsed required to complete the calculation. With reference to the example calculation of pi described above, the calculated value of pi, the time elapsed during the calculation, and the identifier 28 can be provided as the test output 31.

The assessment procedure 32 of the bug report 20 is a computer-executable procedure that is adapted to receive the test output 31 of the test procedure 30, and output a test result 33 to the bug tracking system 12. The test result 33 is formatted in a manner that allows it to be automatically processed by the bug tracking system 12. The bug tracking system 12, upon receiving the test result 33, updates the bug report 20.

The assessment procedure 32 is configured to compare one or more values that are included in the test output 31 to a predetermined criteria. The predetermined criteria can be set as a part of the assessment procedure 32. The predetermined criteria can be a threshold value. The assessment procedure can be configured output the test result 33 in terms of a "pass" result or a "fail" result, along with additional information such as the identifier 28 or a status message that provides information about the test. The status message can include the time elapsed for completion of the test, which is provided to the bug tracking system 12 in a format suitable for tracking as a performance metric. In one example, the test result 33 can is a text string indicating the descriptive name of the bug, an MD5 tag, a pass or fail indication, and a message, such as the time elapsed.

The assessment procedure 32 can be a script that is configured to determine whether the test output 31 is correct, i.e. whether the test output 31 is the same as an expected output, or is within an acceptable tolerance as compared to optimal output. As a further example, where a large number of calculations are performed and their results passed to the assessment procedure as the test output 31, the assessment procedure can determine whether a threshold number of the calculations are correct or acceptable. As a further example, where the test output 31 includes an elapsed time for execution of a calculation, the assessment procedure 32 can compare the elapsed time to a threshold value. Returning the exemplary case of testing a function that calculates pi, the assessment procedure can be configured to verify that the result is correct, and can also be configured to compare the time elapsed during the calculation to a threshold value.

The bug report 20 also includes descriptive information 34. The descriptive information 34 can include a description of the behavior encountered and the conditions under which the behavior arose.

When the bug report 20 is submitted, it is sent from the user system 10 to the bug tracking system 12. The bug tracking system 12 receives the bug report 20, and stores the bug report 20 in the data store 22. In an alternative, the bug report 20 is stored in any suitable storage medium that is accessible by the bug tracking system 12, either associated with or remote from the bug tracking system 12. All of the constituent portions of the bug report 20 are stored together. As an alternative, the constituent portions of the bug report 20 can be stored separately. As an example, the data store 22 includes a single data storage device that is associated with the bug tracking system 12. As an alternative, the data store 22 can include any number of data storage devices that are accessible to the bug tracking system 12, such as by communication over the network 18.

For each bug report 20, the bug tracking system 12 sets a status indicator 42. The status indicator 42 serves as an indication as to whether the issue represented by the bug report 20 has been resolved. In an example, the status indicator 42 is be set to represent an open condition for the bug report 20 or a closed condition for the bug report 20. The open condition indicates that the issue has not been resolved, while the closed condition indicates that the issue has been resolved. The status indicator 42 can be stored in the data store 22 as part of the bug report 20, or can be stored separately and associated with the bug report 20.

The bug report 20 is, in typical usage scenarios, one of a large number of similarly structured bug reports that are contained in the tracking data store 22 of the bug tracking system 12. All of these bug reports, including the bug report 20, are adapted to be utilized by the software testing system 14 to perform automated testing.

Either or both of the bug tracking system 12 and the software testing system 14 are configured to receive the test request 15 and initiate automated testing for the bug report 20. In response to the test request 15, the test procedure 30 of the bug report 20 is executed by the software testing system 14.

In one example of automated software testing, the bug tracking system 12 receives the test request 15, and in response, transmits the test procedure 30 and, optionally, the assessment procedure 32, to the software testing system 14. The test request 15 can, as an alternative, be generated and received by any of the other systems in communication with the bug tracking system 12.

The test request 15 is generated automatically in response to an event or schedule. As an alternative, or in addition, the test request 15 is generated manually, in response to a user request for execution of the test procedure 30. Generation of the test request 15 is sensitive to the status indicator 42. The test request 15 is generated for the bug report 20 if the status indicator 42 is set to the open condition. The test request 15 is not generated for the bug report if the status indicator 42 is set to the closed condition. This behavior can be overridden by the bug tracking system 12, such as in response to a user command that directs that bug tracking system 12 to test all of the bug reports in the tracking data store 22 or a selected bug report, such as the bug report 20, regardless of the status indicator 42.

The test request 15 is generated automatically at predetermined intervals. For example, the test procedure 30 can be executed automatically once per week. This type of scheduling function can be performed by the bug tracking system 12, the software testing system 14, or a separate system.

In an alternative or in addition, the test request 15 is generated automatically in response to commitment of changes to the software source code 24 in the code repository 26 of the code management system 16. In one example, the code management system 16 is configured to send the test request 15 to one of the bug tracking system 12 or the software testing system 14 in response to commitment of changes to the software source code 24.

After the test has been performed, the test result 33 is transmitted to the bug tracking system 12. The bug tracking system 12 updates the bug report 20 to incorporate or reflect the test result 33.

If the test result 33 indicates a "pass" condition, the bug report 20 is closed, by setting the status indicator 42 to represent a closed condition for the bug report 20. In one example, the bug tracking system 12 automatically sets the status indicator 42 to represent a closed condition for the bug report 20 when the test result 33 indicates a "pass" condition. The bug tracking system 12 is configured to automatically notify the user, such as by email, if test result 33 indicates a "pass" condition and/or if the bug report 20 is automatically closed in response to the test result 33.

If the test result 33 indicates a "fail" condition, the bug report 20 is updated to include or indicate the test result 33, such as by a data entry stating reflecting the date on which the test was performed and the test result 33. The user can be notified, such as by email, of the failing test result 33, or can be notified that the bug report remains open at predetermined intervals, i.e. after a specified amount of time has passed since the user was last notified as to the status of the bug report.

Figure 3:
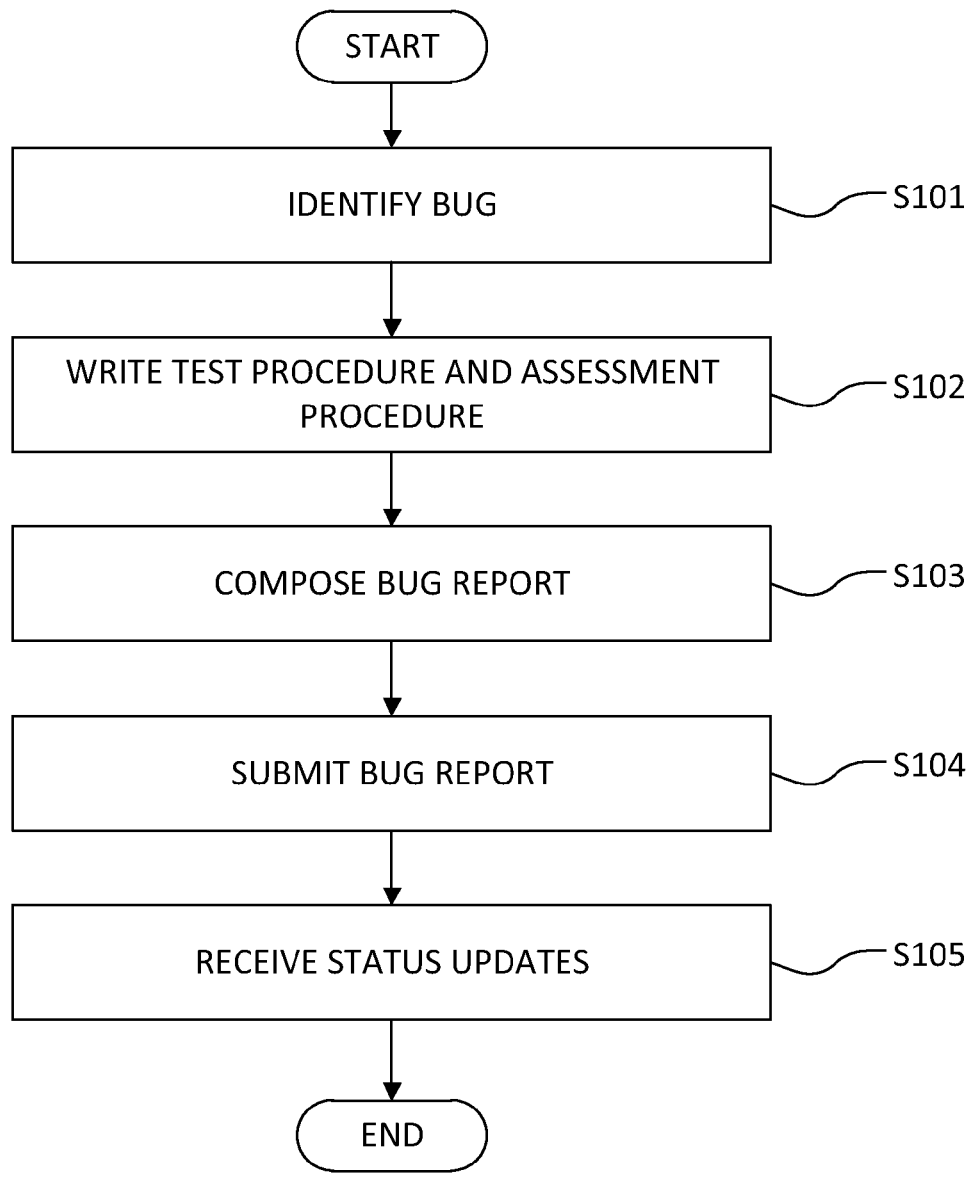
FIG. 3 is a flowchart showing use of an exemplary bug tracking and testing system.

Use of an exemplary bug tracking and testing system will now be explained with reference to FIG. 3.

In step S101, the user identifies bug in the computer program that is defined by software source code 24. In step S102, the user writes the test procedure 30 and the assessment procedure 32. When writing the test procedure 30 and the assessment procedure 32, the user can optionally verify proper operation of the test procedure 30 and the assessment procedure 32, by manually requesting a test using the software testing system 14.

In step S103, the user composes the bug report 20. This is done using the bug submission interface 36, as described previously, or other suitable means. The test procedure 30 and the assessment procedure 32 that were written in step S102 are incorporated in the bug report 20, such as by referencing source code files in one of the file upload fields 40 of the bug submission interface 36.

In step S104, the user submits the bug report 20 to the bug tracking system 12. After submitting the bug report 20, the user will receive status updates from the bug tracking system 12 regarding the bug report 20, such as by email, in step S105. Step S104 is repeated, such as at regular time intervals, while the status indicator 42 of the bug report 20 indicates that the bug report 20 is open. After the bug report 20 has been closed, the process ends, and the user no longer receives status updates from the bug tracking system 12 regarding the bug report 20.

Figure 4:
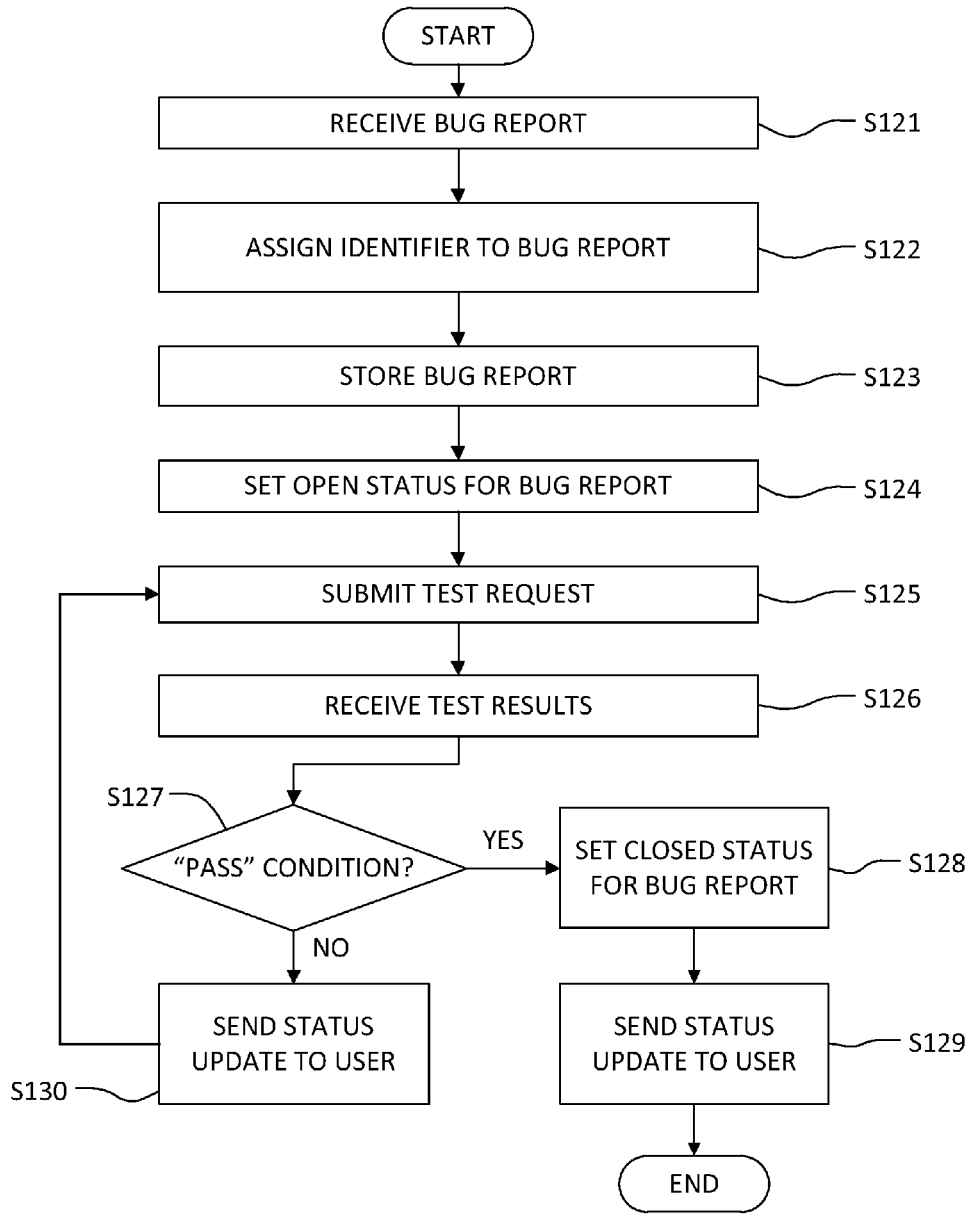
FIG. 4 is a flowchart showing an exemplary process for operation of a bug tracking system.

Operation of the bug tracking system 12 will now be explained with reference to FIG. 4.

In step S121, the bug report 20 is received by the bug tracking system 12. Receipt of the bug report 20 is occurs, for example, in response to submission of the bug report 20 by the user, as in step S105.

In step S122, the bug tracking system 12 assigns the identifier 28, such as an MD5 tag. This step is optional. The identifier 28 can be omitted, manually selected by the user, or assigned by a different system.

In step S123, the bug tracking system 12 stores the bug report 20 in the tracking data store 22. In step S124, the bug tracking system 12 sets the open status for the status indicator 42 of the bug report 20. The bug tracking system 12 stores the status indicator 42 in the bug report 20 or in any other suitable location or manner.

In step S125 a test is requested by submission of the test request 15 to the software testing system 14 by the bug tracking system 12. The bug tracking system 12 also transmits the test procedure 30 and the assessment procedure 32 to the software testing system 14.

After the test request 15 is submitted to the software testing system 14 in step S125, the bug tracking system 12 receives the test result 33 from the software testing system 14 in step S126. The bug tracking system 12 interprets the test result 33 to identify the bug report 20 to which the test result 33 relates, to identify the content of the bug report, and update the bug report 20 with the information from the test result 33. In an exemplary system, the test result 33 is presented to the bug tracking system 12 as a formatted text string, and the bug tracking system is configured to identify specific portions of the test result 33 by parsing the formatted text string using pre-defined parsing rules.

In step S127 the bug tracking system 12 determines whether the test result 33 reflects the passing condition for the bug report 20. If the passing condition is determined, the process proceeds to step S128, where the status indicator 42 is updated to indicate the closed condition for the bug report 20, thereby closing the bug report 20. The process then proceeds to step S129 where a status update is sent to the user indicating that the bug report 20 is closed. The status update is received by the user at step S105. The process then ends.

If the passing condition is not determined for the bug report 20 in step S127, the status indicator 42 for the bug report 20 continues to reflect the open condition, and the bug report 20 is not closed. The process then proceeds from step S127 to step S130.

In step S130 the bug tracking update sends a status update to the user. The status update is received by the user at step S105. This c done immediately after the test is performed, after a batch of tests for numerous bug reports is completed, as a consolidated report, or after a predetermined time period has passed since the last status update was sent. After a triggering event, such as the passage of a predetermined time interval or commitment of changes to the software source code 24, the process returns to S125, where another test request 15 is made. Testing continues in this manner until the bug report 20 is closed, either automatically in response to a "pass" result, or as a result of user intervention to manually close the bug report 20.

Figure 5:
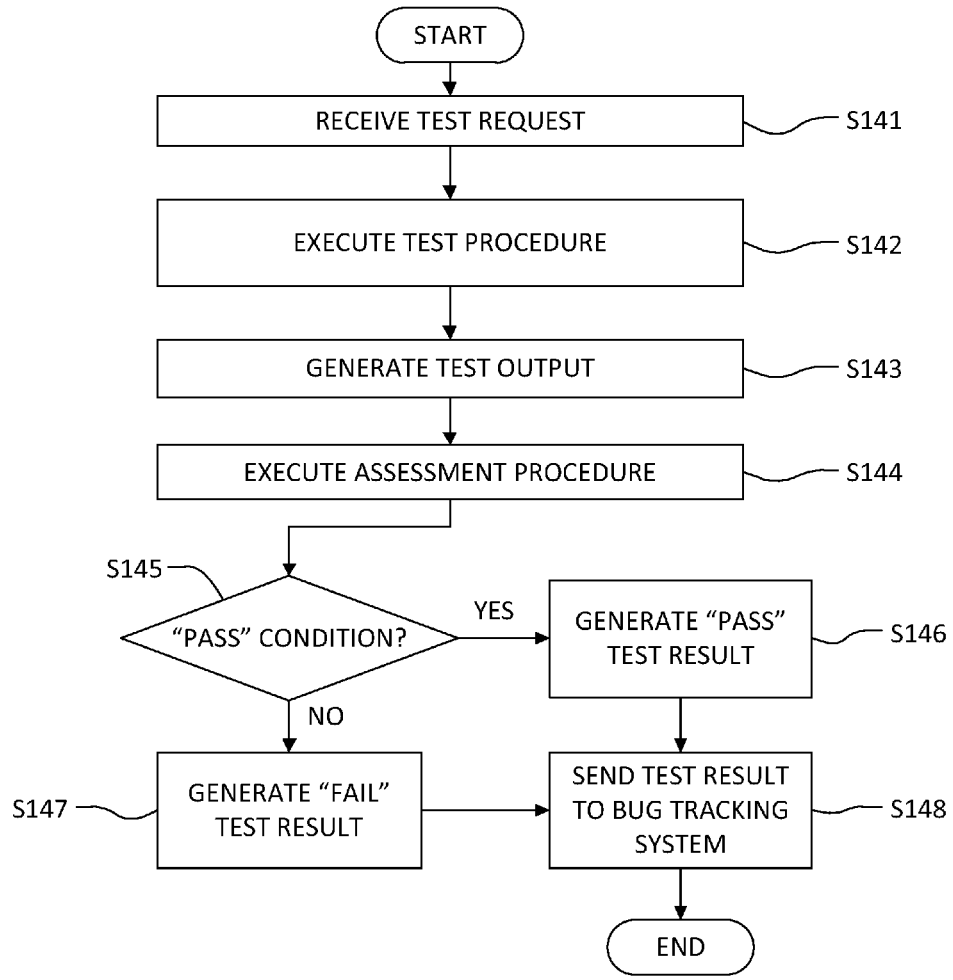
FIG. 5 is a flowchart showing an exemplary process for operation of a software testing system.

Operation of the software testing system 14 will now be explained with reference to FIG. 5.

In step S141, the test request 15 is received by the software testing system 14 from the bug tracking system 12. Receipt of the test request 15 occurs, for example, as a result of submission of the test request 15 by the bug tracking system 12 in step S125.

In step S142, the software testing system executes the test procedure 30. This includes retrieving the test procedure 30 from the tracking data store 22 of the bug tracking system 12 and retrieving at least part of the software source code 24 from the code repository 26 of the code management system 16. This step also includes, if necessary, compiling part of the test procedure 30 and/or the software source code 24. Whether compiling is necessary is dependent upon, for example, the programming language in which the unit test and/or the software source code 24 are written.

In step S143, the test output 31 is generated by the software testing system 14 using the test procedure 30. The assessment procedure 32 is retrieved from the tracking data store 22 of the bug tracking system 12 and is executed by the software testing system 14 in step S144 using the test output 31 as its input. This step includes, if necessary, compiling the assessment procedure 32.

During execution of the assessment procedure 32 at least a portion of the test output 31 is compared to at least one threshold that is included in the assessment procedure 32 to set a "pass" condition or a "fail" condition for the test procedure 30. At step S145, if the "pass" condition was set by the assessment procedure 32, the process proceeds to step S146 where the test result 33 that is generated by the assessment procedure indicates a "pass" condition for the test procedure 30. If the "fail" condition was determined by the assessment procedure 32, the process proceeds from step S145 to step S147 where the test result 33 that is generated by the assessment procedure indicates a "fail" condition for the test procedure 30. After each of step S146 and step S147 the process continues to step S148 where the test result 33 is transmitted to the bug tracking system 12. The process then ends, and further processing is performed by the bug tracking system 12, starting at step S126.

As previously noted, the network 18 allows communication between the user system 10, the bug tracking system 12, the software testing system 14, and the code management system 16 that are connected to a network 18. The network 18 can be, for example, be the internet, which is a packet-switched network, a local area network (LAN), wide area network (WAN), virtual private network (VPN), or any other means of transferring data. The network 18 can be a single network, or can be multiple networks that are connected to one another. It is specifically contemplated that the network 18 can include multiple networks of varying types. For example, the user system 10 can be connected to any or all of the bug tracking system 12, the software testing system 14, and the code management system 16 by the internet. The bug tracking system 12, the software testing system 14, and the code management system 16 can all be connected to one another by a local area network.

The previous examples refer to a single bug report, the bug report 20. The bug report 20 is, however, exemplary of numerous bug reports that are submitted to the bug tracking system 12 and contained within the tracking data store 22. Accordingly, a plurality of bug reports can be present in the tracking data store. The test request 15 can be generated for each of the plurality of bug reports by determining whether the bug report in question has an open status or a closed status, generating a test request 15 if the bug report in question has an open status, and not generating the test request 15 if the bug report in question has a closed status. Optionally, the bug report 20 can be deleted from the tracking data store after the closed condition is set for the status indicator 42 of the bug report 20.

Figure 6:
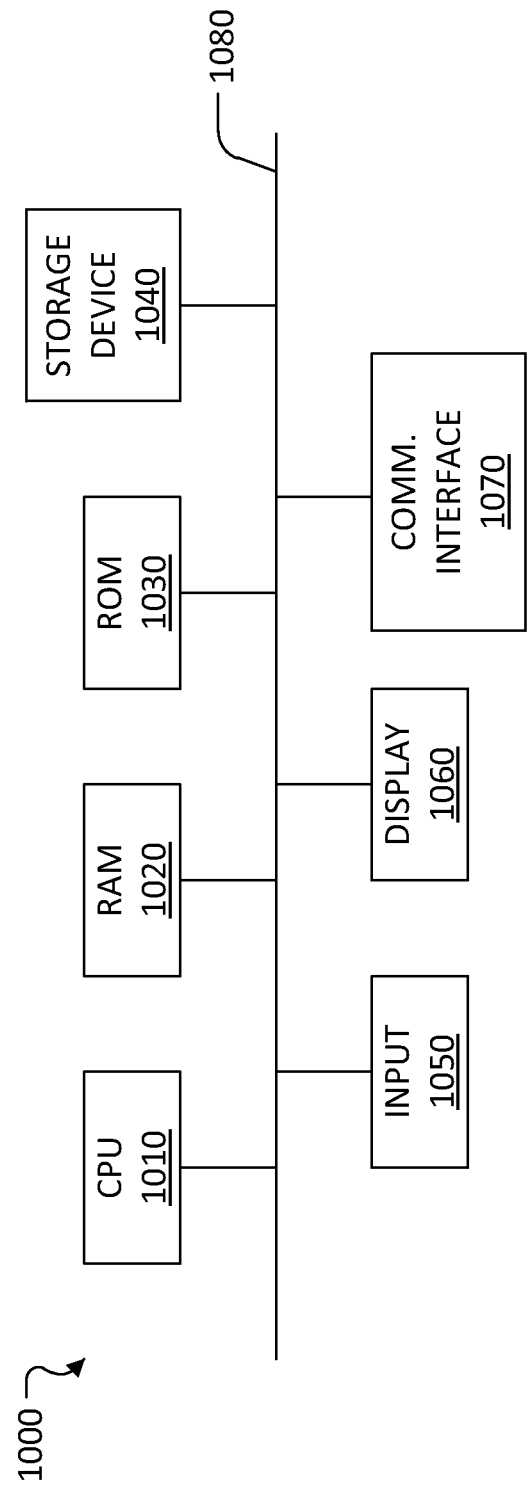
FIG. 6 is a block diagram showing an exemplary computer system.

As previously noted each of these systems can be a single system or multiple systems. For instance, each of the user system 10, the bug tracking system 12, the software testing system 14, and the code management system 16 can be implemented in the form of software suitable for performing the processes detailed herein that is executed by a separate conventional computer 1000, as shown in FIG. 6. The computer 1000 can be any suitable conventional computer. As an example, the computer 1000 includes a processor such as a central processing unit (CPU) 1010 and memory such as RAM 1020 and ROM 1030. A storage device 1040 can be provided in the form of any suitable computer readable medium, such as a hard disk drive. One or more input devices 1050, such as a keyboard and mouse, a touch screen interface, etc., allow user input to be provided to the CPU 1010. A display 1060, such as a liquid crystal display (LCD) or a cathode-ray tube (CRT), allows output to be presented to the user. A communications interface 1070 is any manner of wired or wireless means of communication that is operable to send and receive data or other signals using the network 18. The CPU 1010, the RAM 1020, the ROM 1030, the storage device 1040, the input devices 1050, the display 1060 and the communications interface 1070 are all connected to one another by a bus 1080.

As an alternative, two or more of the user system 10, the bug tracking system 12, the software testing system 14, and the code management system 16 can be implemented on a common conventional computer 1000, thus eliminating the need for communication between such systems over the network 18.

The tracking data store 22 of the bug tracking system 12 and the code repository 26 of the code management system 16 can each be in the form of storage devices that are part of or are associated with the bug tracking system 12 and the code management system 16, respectively. As an alternative, the tracking data store 22 and the code repository 26 can each be in the form of storage devices that are remote from the remainder of the bug tracking system 12 and the code management system 16, respectively. The tracking data store 22 is formatted in any suitable manner of such a storage device. For example, the tracking data store 22 can be a database containing the bug reports 20, or can be stored by any other structured or unstructured data storage method.

While the disclosure is directed to what is presently considered to be the most practical embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computer implemented software testing method, comprising:
outputting information that, when interpreted by a user system, causes a bug report submission interface to be output for display at the user system;
receiving, by transmission from the user system and in response to a user input at the bug report submission interface, a bug report regarding software under test, wherein the bug report includes information describing an issue identified with respect to the software under test, a test procedure that is related to the issue identified with respect to the software under test, and an assessment procedure;
storing the bug report in a computer readable data store upon receiving the bug report;
setting an a status indicator for the bug report to an open condition upon storing the bug report;
requesting execution of the test procedure and the assessment procedure;
executing the test procedure and the assessment procedure using a processor;
receiving a test result from the processor indicating a pass state or a fail state for the test procedure, wherein the test output includes an elapsed time for performing at least part of the test procedure, and the assessment procedure produces the test result by comparing the elapsed time to a threshold value; and
setting the status indicator for the bug report to a closed condition if the pass state is determined for the test procedure.

2. The computer implemented software testing method of claim 1, wherein the test result includes the elapsed time, and the elapsed time is stored as part of the bug report.

3. The computer implemented software testing method of claim 1, wherein the test result includes an identifier that is unique to the bug report.

4. The computer implemented software testing method of claim 1, wherein the steps of requesting execution of the test procedure and receiving a test result are selectively performed in response to the open condition of the status indicator of the bug report.

5. The computer implemented software testing method of claim 1, further comprising:
storing at least part of the test result in the bug report.

6. The computer implemented software testing method of claim 1, further comprising:
sending an update to a user after setting the status indicator for the bug report to the closed condition.

7. The computer implemented software testing method of claim 1, wherein the step of requesting execution of the test procedure is performed by a bug tracking system and the processor is part of a software testing system.

8. The computer implemented software testing method of claim 1, further comprising:
generating a web application having a bug submission interface and sending the web application to a user system for submission of the bug report.

9. A computer implemented software testing method, comprising:
receiving a plurality of user-submitted bug reports regarding software under test, each bug report including a user submitted test procedure and a user submitted assessment procedure;
storing the bug reports in a computer readable data store upon receiving the bug report;
setting an a status indicator for each bug report to an open condition upon storing each bug report;
requesting execution of the test procedure corresponding to each bug reports on a selective basis in response to the open condition of the status indicator of the bug report;
executing the test procedure of each selected bug report using a processor to produce a test output;
executing the assessment procedure of each selected bug report using the processor of the software testing system to produce a test result by comparing a test output of the test procedure to a predetermined criteria, the test result indicating a pass state or a fail state for the test procedure, wherein the test output includes an elapsed time for performing at least part of the test procedure, the predetermined criteria is a threshold value, and the assessment procedure compares the elapsed time to the threshold value to produce the test result;
sending the test result to the bug tracking system; and
setting the status indicator for each selected bug report to a closed condition if the pass state is determined for the test procedure.

10. The computer implemented software testing method of claim 9, further comprising:
sending an update to a user after setting the status indicator for the bug report to the closed condition.

11. A bug tracking and testing system, comprising:
one or more processors:
a bug tracking system that is implemented using the one or more processors and is configured to receive a plurality of user-submitted bug reports regarding software under test, store the bug reports in a computer readable data store, and set an a status indicator for each bug report to an open condition upon storing each bug report, each bug report including a user-submitted test procedure and a user-submitted assessment procedure; and
a software testing system that is implemented using the one or more processors and is configured to receive test requests for selected bug reports of the plurality of bug reports, where the selected bug reports have the open condition, execute the test procedure of each selected bug report using a processor of the software testing system to produce a test output, and execute the assessment procedure of each selected bug report using the processor of the software testing system to produce a test result indicating a pass state or a fail state for the test procedure based on the test output, where the assessment procedure produces the test result by comparing the test output of the test procedure to a predetermined criteria, the predetermined criteria is a threshold value, the pass state is indicated if the test output satisfies the threshold value and the fail state is indicated of the test output does not satisfy the threshold value, the test output includes an elapsed time for performing at least part of the test procedure, the assessment procedure compares the elapsed time to a threshold value to produce the test result, the test result is sent to the bug tracking system, and the status indicator for each selected bug report is set to a closed condition by the bug tracking system if the pass state is determined.

* * * * *